US007792906B2

(12) United States Patent
Garcia-Martin et al.

(10) Patent No.: US 7,792,906 B2
(45) Date of Patent: Sep. 7, 2010

(54) COMMUNICATION NETWORKS

(75) Inventors: Miguel-Angel Garcia-Martin, Jorvas (FI); Janne Suotula, Jorvas (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2306 days.

(21) Appl. No.: 10/216,322

(22) Filed: Aug. 12, 2002

(65) Prior Publication Data
US 2003/0069934 A1 Apr. 10, 2003

(30) Foreign Application Priority Data
Aug. 14, 2001 (GB) .................................. 0119819.1

(51) Int. Cl.
*G06F 15/16* (2006.01)
(52) U.S. Cl. ........................ 709/206; 709/204; 709/205; 709/207; 713/151; 713/164; 713/166; 713/167; 370/252; 370/219; 370/224; 370/352; 370/400
(58) Field of Classification Search .................. 709/206, 709/227, 203, 219, 204, 223, 207; 370/352, 370/401; 379/93.01, 211; 455/414.2
See application file for complete search history.

(56) References Cited

U.S. PATENT DOCUMENTS

| | | | |
|---|---|---|---|
| 6,301,609 B1 | 10/2001 | Aravamudan et al. | |
| 6,658,095 B1 * | 12/2003 | Yoakum et al. | 379/93.01 |
| 6,775,368 B1 * | 8/2004 | Lee et al. | 379/211.02 |
| 6,870,830 B1 * | 3/2005 | Schuster et al. | 370/352 |
| 6,885,861 B2 * | 4/2005 | Koskelainen | 455/414.2 |
| 6,928,070 B2 * | 8/2005 | Emerson, III | 370/352 |
| 6,954,442 B2 * | 10/2005 | Tsirtsis et al. | 370/328 |
| 2001/0023181 A1 * | 9/2001 | Savolainen | 455/411 |
| 2002/0071539 A1 | 6/2002 | Diament et al. | |
| 2002/0075303 A1 * | 6/2002 | Thompson et al. | 345/751 |
| 2002/0076025 A1 * | 6/2002 | Liversidge et al. | 379/202.01 |
| 2007/0118604 A1 * | 5/2007 | Costa Requena | 709/206 |

FOREIGN PATENT DOCUMENTS

| | | |
|---|---|---|
| GB | 2 357 936 A | 7/2001 |
| GB | 2 363 938 A | 1/2002 |
| WO | 01/72055 A2 | 9/2001 |

OTHER PUBLICATIONS

GB Search Report mailed Jan. 30, 2003 in corresponding GB application No. GB 0217454.8.

* cited by examiner

*Primary Examiner*—Jude J Jean Gilles
(74) *Attorney, Agent, or Firm*—Nixon & Vanderhye, P.C.

(57) ABSTRACT

A method of enabling a terminal 1,2 coupled to a GSTN 10 to join an Internet based presence service facilitated by a presence server 6. The method comprises establishing a telephone connection between said terminal 1,2 and an intermediate server 4 via the GSTN 10, as a result of said connection, establishing a proxy entity corresponding to said terminal 1,2 at said intermediate server 4 and registering the proxy entity with the presence server 6 via the Internet, and exchanging presence service messages between the presence server 6 and the proxy entity at the intermediate server 4 via the Internet and between the proxy entity and said terminal 1,2 via the GSTN network 10.

9 Claims, 5 Drawing Sheets

COMMUNICATION NETWORKS

FIELD OF THE INVENTION

The present invention relates to communication networks and in particular, though not necessarily to communication networks comprising fixed line telephones and telephone connections.

One of the "killer" applications in the Internet today is Instant Messaging and Presence (IM&P) services. Users are typically connected to the Internet using computers, PDAs or similar devices, and are allocated either a fixed IP address or a dynamic IP address (e.g. by an ISP). An example scenario is illustrated in FIG. 1 where a user (user A) registers his presence with the presence server by sending his username an IP address to the presence server, thereby making his presence information available to other users. The user also subscribes to the presence of two friends (users B and C). Immediately, the presence server informs user A, that friends B and C are not present at that moment. Later, one of the friends (user B) registers his presence with the presence server, making his presence information available to others. User B subscribes to user C's presence. Immediately, the presence server informs user A that user B is now online. The presence server also informs user B that user C is not present. When user C registers his presence with the presence server, his presence information is available immediately to all other users who are subscribed to user C's presence. All of these users receive a notification when user C is registered.

A user can send or receive instant messages to or from his friends (users A and B) using the IP addresses available on the presence server. An Instant Message exchange sequence between a pair of users gives both users the "feeling" of having a text conversation. This is illustrated in FIG. 2. In some sophisticated applications, a user can also send e-mail, files, share a whiteboard, have a web conference or even initiate a voice call using the presence server. The common denominator for these services is that users are connected to the Internet and make their presence information available to other users.

SUMMARY

The range of services available to mobile and fixed line telephone subscribers (referred to hereinafter as General Switched Telephone Network (GSTN subscribers) has increased significantly in the last few years. Services such as call forwarding and call waiting are now in common use. However, GSTN subscribers have limited access to certain advanced services which may be readily available to subscribers who have broadband connections and to subscribers of current and future packet switched mobile networks. These services include the IM&P services described above.

It is an object of the present invention to increase the range of services available to GSTN subscribers. It is also an object of the present invention to make it easier for GSTN subscribers to access the Internet and to alert GSTN subscribers to IP connection requests from third parties.

According to a first aspect of the present invention there is provided a method of enabling a terminal coupled to a GSTN to join an Internet based presence service facilitated by a presence server, the method comprising:

establishing a telephone connection between said terminal and an intermediate server via the GSTN;

as a result of said connection, establishing a proxy entity corresponding to said terminal at said intermediate server and registering the proxy entity with the presence server via the Internet; and exchanging presence service messages between the presence server and the proxy entity at the intermediate server via the Internet and between the proxy entity and said terminal via the GSTN network.

Today, so-called Instant Messaging and Presence services are restricted to Internet connections and Internet capable devices (e.g. computers, Personal Digital Assistants (PDAs), etc.). The invention described here allows all mobile phones and Public Switched Telephone Network (PSTN) telephones to use and share these services with other Internet users.

The present invention can be implemented using an Instant Messaging and Presence Agent for GSTN and which is a new product that offers Instant Messaging and Presence services for GSTN users. It allows users who have a conventional "black" phone or a mobile phone to notify their presence to Internet users, be notified about the presence in the network of their friends and colleagues, and send and receive instant messages to them. "Normal" Internet users do not know whether a remote user is registered to the IM&P server via the Internet or via a fixed or mobile phone.

The telephone connection between said terminal and an intermediate server may comprise a circuit switched connection between the terminal and the intermediate server. Alternatively, the connection may be provided by an exchange of SMS messages or via some other mechanism.

The presence service messages may relate to the availability of subscribers of the presence service, e.g. in or out. They may also be used to convey instant messages such as text messages. For instant messages originating at the GSTN terminal, the intermediate server may perform a translation between voice and text. For messages destined for the GSTN terminal the intermediate server may perform a translation between text and voice.

In an embodiment of the invention, following the establishment of said proxy entity said telephone connection is terminated and, in the event that the proxy server needs to send a presence service message to said terminal, a call is made to the terminal to establish a connection over the GSTN. The proxy server has a knowledge of a GSTN telephone number at which said terminal can be reached.

According to a second aspect of the present invention there is provided a method of enabling a terminal coupled to a GSTN to access multimedia services available over an IP network, the method comprising:

establishing a telephone connection between said terminal and an intermediate server;

as a result of said connection, establishing a proxy entity corresponding to said terminal at the intermediate server and registering the proxy entity with a multimedia server via the IP network;

exchanging multimedia call control messages between the multimedia server and the proxy entity at the intermediate server, wherein the intermediate server interprets received call control messages to set up multimedia calls to the GSTN terminal.

The Register Agent (RA) for GSTN is a new product that offers a registration service for GSTN users when the users own an IP Multimedia subscription. The RA allows users who have a black phone or a mobile phone to register with the IP Multimedia network. The users don't need to keep a permanent connection to the IP Multimedia network in order to receive incoming sessions The multimedia server may be a SIP server, with SIP call control messages being exchanged between the multimedia server and the proxy entity at the intermediate server.

According to a third aspect of the present invention there is provided a method of setting up a multimedia call to a user over an IP network in response to an incoming request to set up the call, the method comprising:

intercepting the request at a node coupled to the IP network;

suspending the connection set-up procedure;

alerting the user to the incoming request using a communication channel of a telephone network;

allowing the user to continue the set-up of the multimedia call by connecting a user communication terminal to the IP network; and resuming the suspended connection set-up procedure and relaying the incoming request to the user communication terminal.

According to a fourth aspect of the present invention there is provided a method of setting up a multimedia call to a user over an IP network in response to an incoming request to set up the call, the method comprising:

intercepting the request at a node coupled to the IP network;

suspending the connection set-up procedure;

at said node, initiating a circuit-switched connection to a user communication terminal; and following establishment of said circuit-switched connection, resuming the suspended connection set-up procedure and relaying the incoming request to the user communication terminal over said circuit-switched connection.

DESCRIPTION OF PREFERRED EMBODIMENTS

In the discussion below, the following abbreviations will be used:

| | |
|---|---|
| 2G | 2nd Generation (of mobile systems) |
| GSM | Global System for Mobile |
| GSTN | General Switched Telephone Network |
| GW | Gateway |
| HLR | Home Location Register |
| HSS | Home Subscriber Server |
| IETF | Internet Engineering Task Force |
| IM&P | Instant Messaging and Presence |
| IMPA | Instant Messaging and Present Agent |
| IP | Internet Protocol |
| ISDN | Integrated Services Digital Network |
| MSC | Mobile Switching Centre |
| MRF | Media Resource Function |
| PDA | Personal Digital Assistant |
| PLMN | Public Land Mobile Network |
| PSTN | Public Switched Telephone Network |
| RTSP | Real Time Streaming Protocol |
| SIP | Session Initiation Protocol, RFC 2543 |
| SMS | Short Message Service |
| VLR | Visitor Locator Register |
| VRS | Voice Recognition System |

Figure 1:
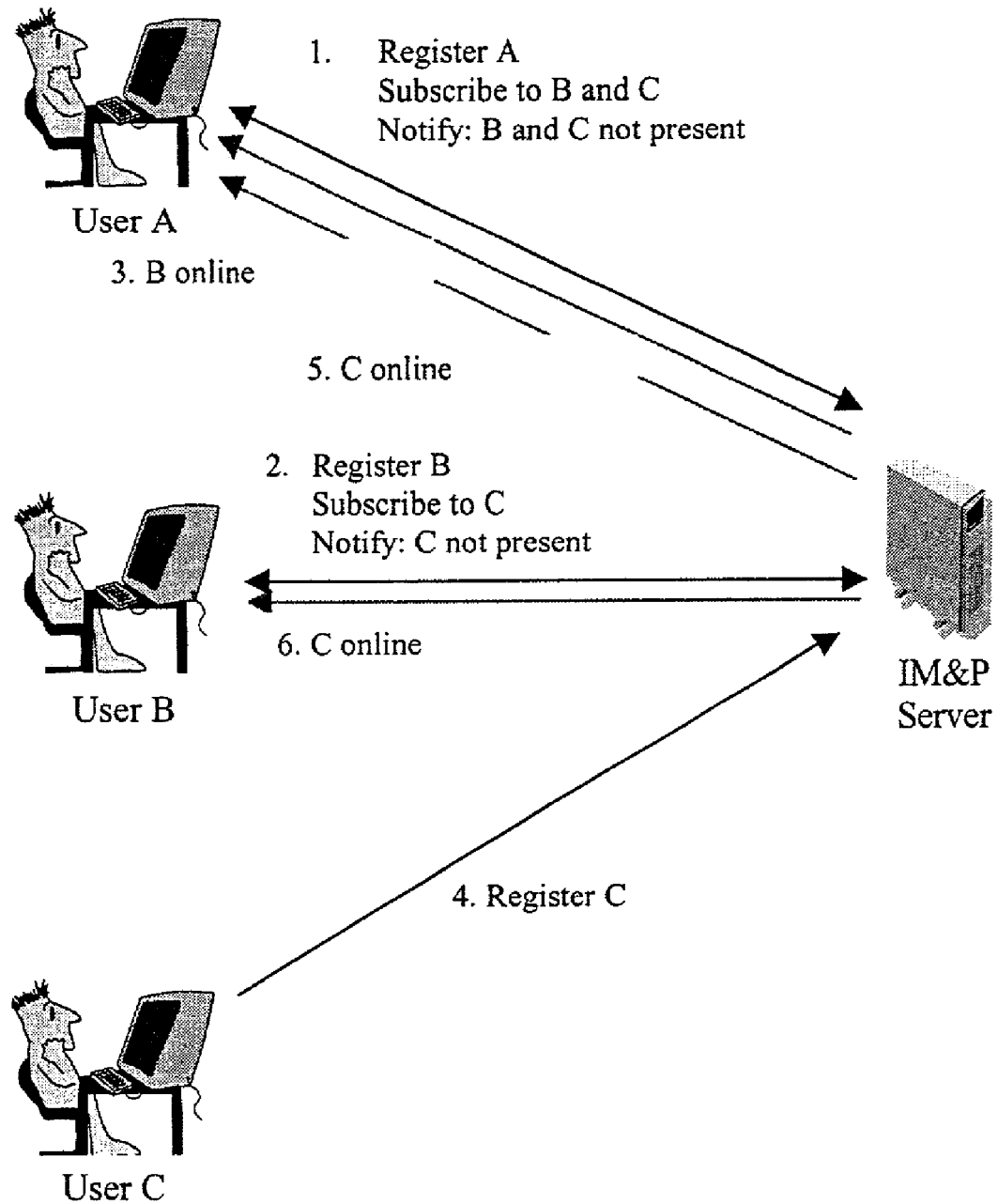
FIG. 1 illustrates schematically a presence registration and notification procedure.
Figure 2:
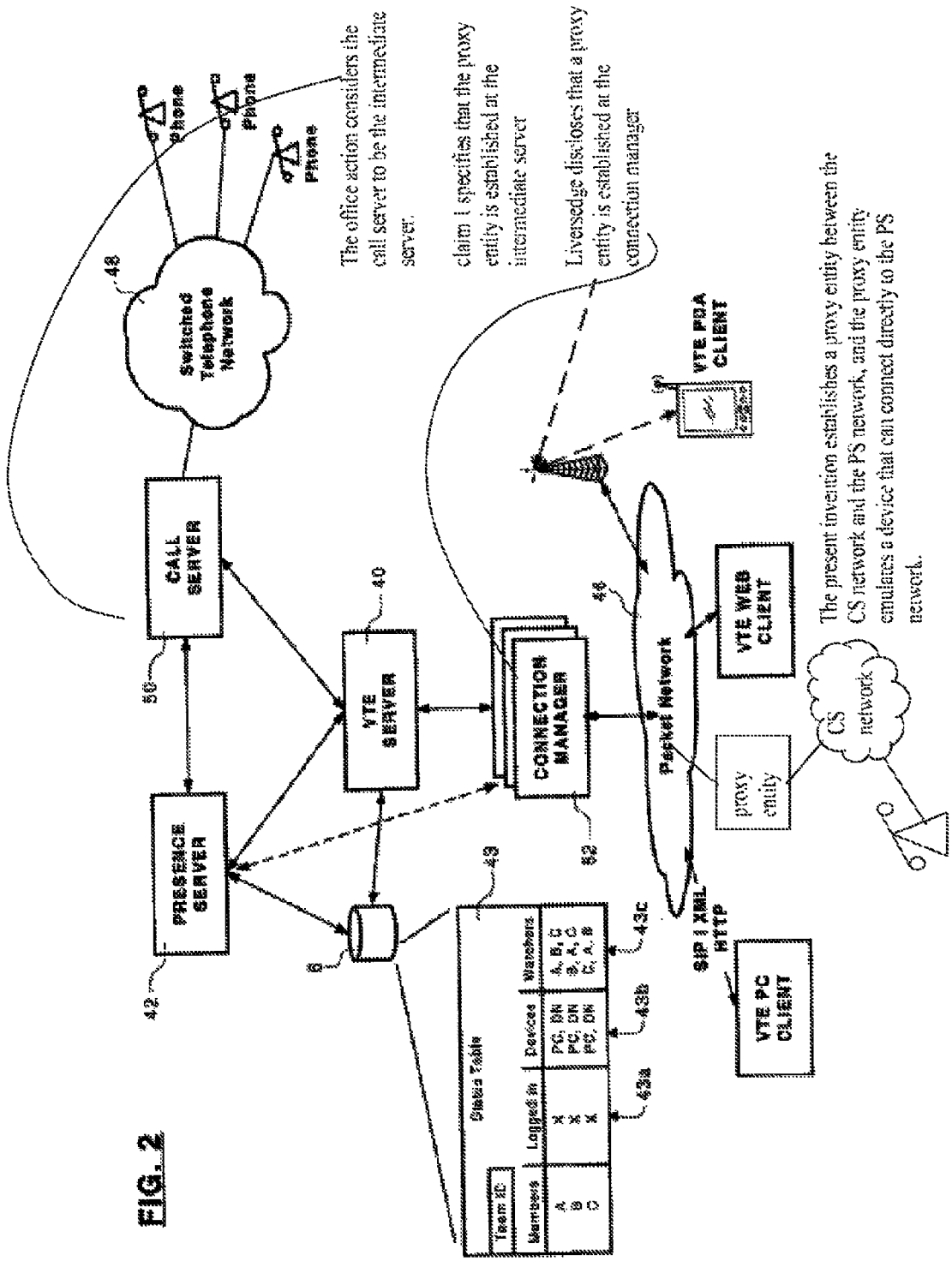
FIG. 2 illustrates schematically an instant messaging exchange.
Figure 3:
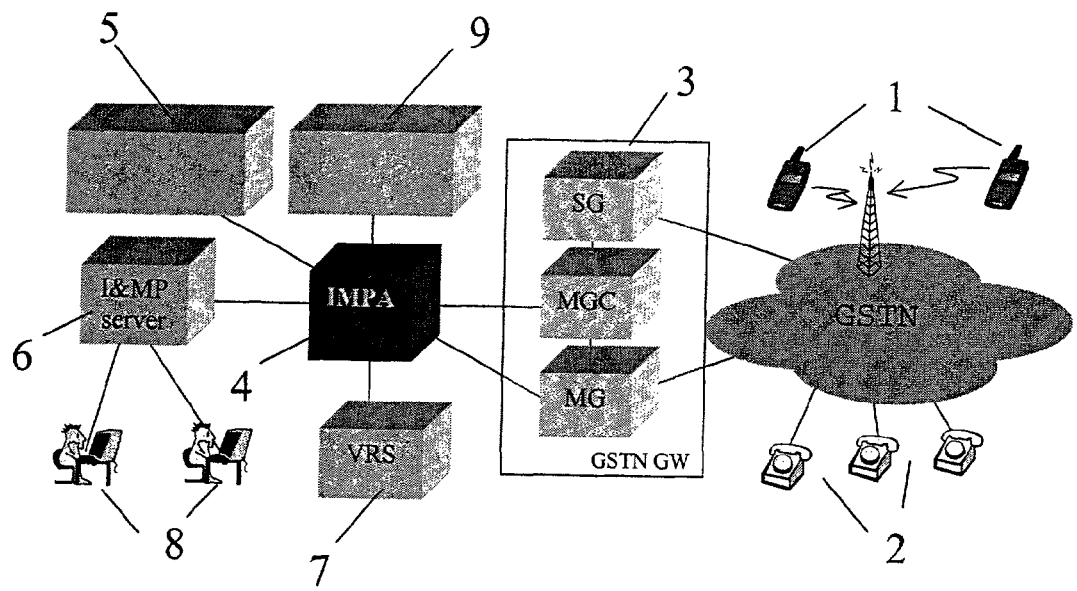
FIG. 3 illustrates schematically an IMPA architecture.

The Instant Messaging and Present Agent (IMPA) is an agent which acts on behalf of GSTN users (e.g. subscribers to a PSTN or GSM network), according to the users' instructions. Users connected to the IMPA can use different types of terminals including but not limited to regular analogue phones, regular ISDN phones, and GSM phones. The IMPA is typically an application that makes use of other existing products and services, such as:

a PSTN gateway to get and make calls to and from the PSTN and the PLMN;

an announcement Player to play audible announcements;

a Voice Recognition System to convert speech to text;

a text-to-speech converter, to read text messages in an audible format;

FIG. 3 shows an overview of the architecture including the re-use of existing components. According to the IMPA architecture, a GSTN user (fixed or mobile phone) 1,2 makes a call that passes through a GSTN GW 3 and terminates in the IMPA 4. The IMPA 4 connects the announcement player 5, welcomes the user, and ask for a unique PIN code to authenticate the GSTN user 1,2. The user 1,2 is then presented with an audible menu of options. In the general case, the user 1,2 will press the proper key to register. Then, the IMPA 4 registers on behalf of the user to an I&MP server 6. As part of the registration process, the IMPA 4 will register the telephone number of the user (if this is not already stored by the IMPA as a default number. If the registration is successful, the GSTN user 1,2 is advised accordingly. The telephone call may finish at this time, or the user 1,2 might want to perform other actions (help, settings, etc).

When the GSTN user 1,2 wants to subscribe to another user's presence, he makes a call that passes through a GSTN GW 3 and terminates in the IMPA 4. The IMPA 4 connects the announcement player 5, welcomes the user, and ask for a unique PIN code to authenticate the GSTN user 1,2. After that, the user 1,2 is presented with an audible menu of options. The user 1,2 will press the proper key to subscribe to another user's presence. Then, the IMPA 4 prompts for the identifier of the remote user, and sends the subscription request to the IM&P server 6. Finally, the GSTN user 1,2 is informed of the result of the procedure. The user 1,2 may then release the call or take some other action.

In the event that presence information of a subscribed user changes (e.g. because the user goes online or offline), the IMPA 4 is notified. The IMPA 4 then makes a telephone call to the GSTN user(s) registered to that user's presence and plays an announcement telling the presence information of the other user. The GSTN user 1,2 may then release the call, send an Instant message, or select another action to be carried out.

If a GSTN user 1,2 wants to send an Instant Message, he dials a predefined telephone number. The call traverses a PSTN gateway and terminates in the IMPA 4. The IMPA 4 connects the announcement player 5 and welcomes the user

1,2, and asks for a unique PIN code to authenticate the GSTN user. After that, the user 1,2 is presented with an audible options menu. If the user 1,2 chooses the option to send an Instant Message, the user is prompted to choose the destination user and, after that, to speak an audible message. The IMPA 4 connects to a Voice Recognition System (VRS) 7 and receives the message. The VRS 7 delivers the text version back to the IMPA 4, as well as the audible file of the spoken message. The IMPA 4 then sends an Instant Message to the IM&P server 6 on behalf of the GSTN user 1,2. The message contains both the text and the audio file delivered by the VRS 7. After that, the GSTN user 1,2 is informed about the successful delivery of the message. The user may release the call at this point or keep the telephone call if he wants to wait for an answer, send another Instant Message, etc.

Consider now the example of an IP user 8 sending an Instant Message to a user 1,2 who is connected via a GSTN 10. The message is received by the IM&P server 6 and routed to the IMPA 4. The IMPA 4 checks its database of users and detects that the message is to be delivered to one of its users. The IMPA 4 makes a call through the GSTN gateway 3. The call is terminated in the GSTN user's phone. When the GSTN user 1,2 answers the call, he receives a welcome message and is asked if he wants to receive the Instant Message. If the user accepts, the IMPA 4 connects a text-to-speech converter 9. The text-to-speech converter 9 reads the message. When the message has been read, the IMPA 4 prompts the user for further actions: e.g. he may want to reply with another Instant Message or just disconnect the call.

The functionality of the IMPA 4 is not tied to any standard protocol. A protocol module can be integrated into the IMPA and it will work with that module. However, there are certain standards and proprietary protocols that should be noted:

Calls to and from the GSTN

Calls to and from the GSTN can use the SIP protocol or H.323. No standardization extensions are required.

Instant Messaging and Presence

Registering users (presence) and sending and receiving Instant Messaging is not standard dependent. At the time of writing this document, there are several proprietary protocols developed by a few companies (Yahoo, ICQ, Microsoft, AOL or Ericsson's iPulse). IMPA 4 is able to interoperate with any of these protocols, providing that the proper protocol stack is inserted into IMPA 4.

The IETF has already agreed into a common framework for Instant Messaging and Presence. There are different Working Groups working to develop a standard. Perhaps the most interesting working group is SIMPLE (SIP for Instant Messaging and Presence Leveraging Extensions.

Connection of Adjacent Nodes

As the IMPA 4 may need to connect to other auxiliary nodes, such as the VRS 7, text-to-speech converter 9 or announcement player 5, an appropriate interfacing protocol may be needed. The RealTime Streaming Protocol (RTSP) developed by the IETF, provides announcement play and recording capabilities needed to control all such adjacent nodes.

The concept of a Register Agent (RA) will now be described. A Register Agent controls the establishment of dial-up sessions and the forwarding of incoming Multimedia calls to GSTN subscribers. It will be appreciated from the following discussion that a RA may be used in parallel with an IMPA such as is described above.

A registration procedure is used by an IP-terminal (e.g. a SIP-phone, an IP multimedia 3G-phone etc.) for two different purposes:

1. To inform the network where it is reachable, i.e. the terminal's address. This is to provide the network with a point of contact in order to receive calls.
2. To establish a predetermined path towards his home network so that services can be executed when the user initiates or terminates a call. It is possible to have other types of services that are not related to a call.

Problem 1:

If the user has only a non-IP-terminal available (e.g. traditional analogy or ISDN terminals or 2G-phones, etc.), he cannot make himself reachable to IP-terminals except possibly via a voice-only call.

Problem 2:

It is very common that users own IP Multimedia devices (e.g., computer), and connect to the Internet via a dial-up connection (e.g. modem, ISDN . . . ). In these cases, the common denominator is that users will not be permanently connected to the Internet. Another aspect is that there is a telephone line that is used both for telephone connections and connections to the Internet. Therefore, even if users own an IP terminal (e.g., computer) connected to the Internet through a non permanent connection (e.g., dial-up connection), they cannot receive incoming Multimedia calls when they are not connected to the Internet.

The Register Agent proposed here allows IP Multimedia users having only circuit switched connections to register and disconnect the circuit switched connections whilst maintaining "virtual" connections such that they can continue to receive multimedia sessions by establishing dial-up connections on demand. The following example non-IP terminals can make use of the Register Agent in order to register to the IP Multimedia Network:

regular analogue phones (with or without IP-terminal connected);

regular ISDN phones (with or without IP-terminal connected);

GSM phones (with or without IP terminal connected).

Considering now the RA 101 in more detail, this is an application that makes use of certain existing products and services such as:

a GSTN gateway 102 to receive and make calls to and from the GSTN 103;

a Media Resource Function (MRF) 104 to play audible announcements;

SIP servers 105;

an Interface to an SMS GW 106 to allow the RA 101 to send and receive SMS messages.

Figure 4:
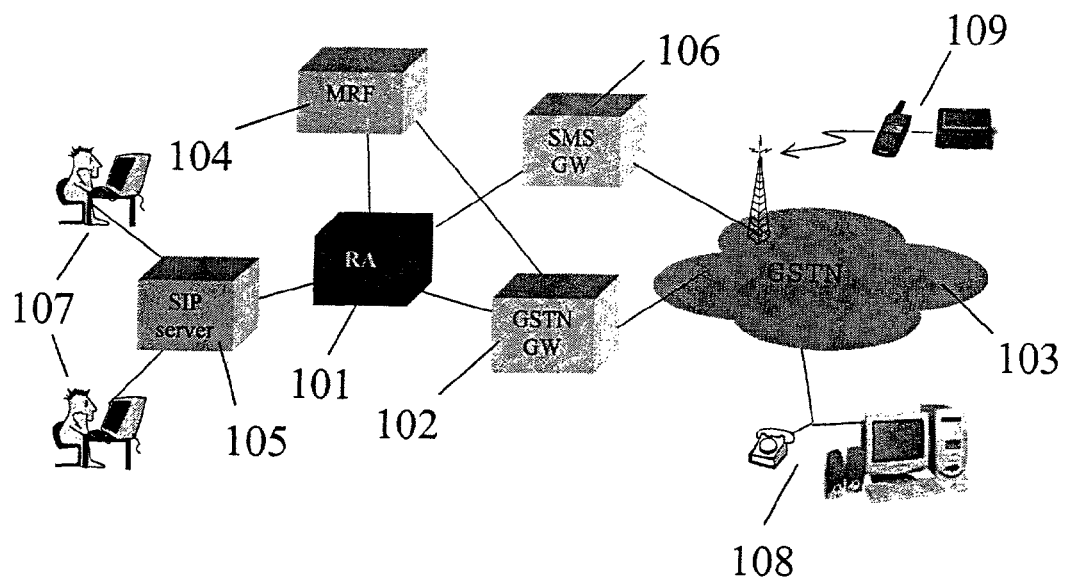
FIG. 4 illustrates schematically a register agent within a SIP network.

FIG. 4 shows an overview of the architecture and the re-use of existing components (it will be appreciated that it is possible to adapt the RA to other call control network types other than SIP, e.g. H.323.

In the example of FIG. 4, the SIP servers 105 form part of an IP multi-media (IPMM) network. Users 107 connected to the IPMM network via a packet switched network consume resources of the access network only when a registration or re-registration transaction happens. This basically means that the cost of a registration for the operator and the user is minimal. However, this is not the case if a circuit switched network is used to access the Internet and the IPMM network (note that a circuit switched network will be the access for non-IP terminals or for IP terminals using a dial-up connection). This leads to the proposal here that the IPMM network requires a component to handle registration on behalf of such users 108,109. Using such a component, i.e. the Register Agent, access network resources are only used when a user registers to the network. After that, the user can terminate the circuit switched connection.

Two main benefits result from the use of the RA:
1. the ability to receive voice calls at a GSTN (non-IP) phone;
2. the ability to receive multimedia calls on demand at an IP terminal using a dial-up connection.

In the following paragraphs we describe four procedures to illustrate how the RA 101 can be accessed by a user 108,109 via a circuit switched network 103 in order to register with the RA 101.

1. Registration Procedure Using a Dial-Up Connection

In this procedure the user wishes to register himself in the IP Multimedia network using a dial-up connection and an IPMM terminal 108,109 (e.g. an appropriately configured PC). He does this using the following steps:

The IPMM terminal 108,109 is connected to a modem or terminal adapter and establishes a dial-up connection using the GSTN GW 102;

The IPMM terminal 108,109 registers to the RA 101 and supplies the needed parameters to configure the registration;

If registration is successful the user 108,109 can disconnect the dial-up connection.

From this point on, the RA 101 will automatically do all necessary refreshing of the registrations on behalf of the user 108,109.

2. Registration Procedure Using a Black Phone

If the user has a conventional fixed line or black phone, he must dial a predefined telephone number. This call terminates at the RA 101. The RA 101, upon receipt of the call, connects the announcement player of the MRF 104, welcomes the user and ask for his authentication PIN. The user 108,109 can send the authentication PIN with DTMF (touch-tone) tones. Voice recognition could alternatively be used. Once the user is authenticated, he navigates through a series of voice menus. At the end of the procedure, the user is registered and can terminate the call.

3. Registration Procedure Using SMS

If the user is a subscriber of a GSM mobile network, the user can send an SMS text message to a predefined telephone number. The SMS contains details relating to the registration options. The SMS arrives at the RA 101, which interprets the contents of the SMS and generates another SMS, with the result of the transaction, which is returned to the user. Note that in this procedure, there is no need to authenticate the user, as GSM authentication procedures can be relied upon. In other words, if the user can send an SMS he has already authenticated by the GSM network.

4. Automatic Registration Procedure for 2G Networks

Figure 5:
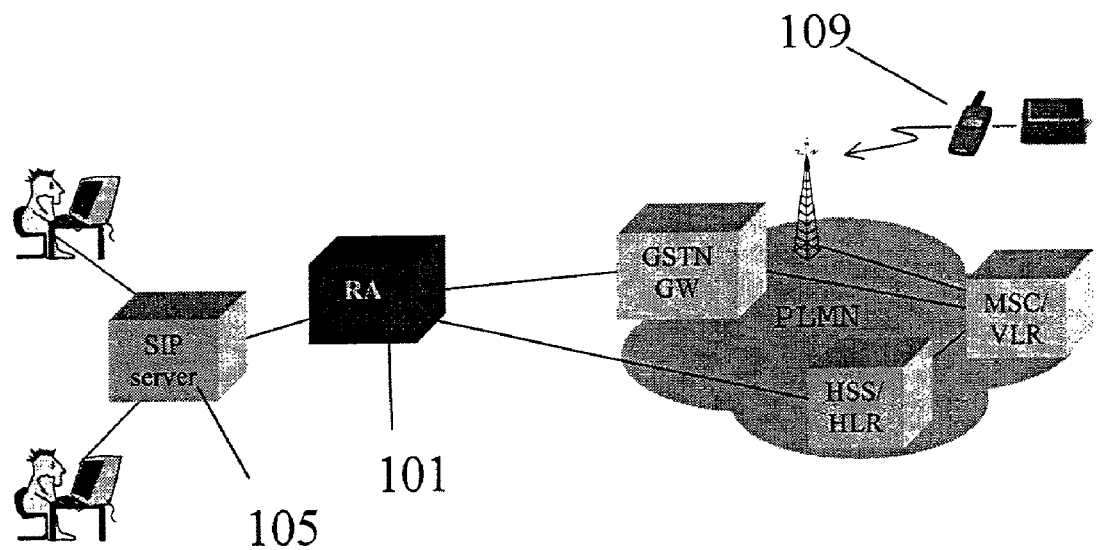
FIG. 5 illustrates schematically an automatic registration procedure with the register agent of FIG. 4.

This case covers the scenario where a user who owns an IPMM subscription and a 2G subscription (e.g. GSM) is registering from a 2G terminal 109 (see FIG. 5 below). When a 2G terminal 109 attaches to and registers with a 2G network, the MSC/VLR reports to the HSS/HLR. Following registration of the user, the HSS/HLR can automatically register the user with the RA 101, which in turns registers the user to the SIP registrar server. The user 109 may be notified of the result of the IPMM registration with an SMS.

In the preceding paragraphs, different methods for registering users to the RA have been described: these methods are dependent on the access networks used. In the following passages the procedures common to the registration process and which are access network independent will be described.

Once the user 108,109 has chosen a particular access procedure, he can choose different options regarding how he should be alerted to incoming multimedia/voice calls and how these calls should be processed. There are three different possibilities which will affect the registration procedure:

Non-IP Multimedia terminal: The user 108,109 informs the RA 101 that he is using a non-IP terminal, and therefore that he can receive only voice calls. The RA 101 should route incoming calls to the telephone number in the circuit switched network provided by the user.

Manual Multimedia call on demand: The user 108,109 informs the RA 101 that he is using an IP multimedia terminal that can connect to the IPMM network over a dial-up connection using the manual procedure described above. The user also informs the RA 101 how he should be alerted when an incoming Multimedia session arrives: e.g. via a telephone call, SMS, pager message, etc.

Automatic Multimedia call on demand: The user 108,109 informs the RA 101 the he is using an IP multimedia terminal that can connect to the IPMM network over a dial-up connection using the automatic procedure described here. The user also provides the telephone number that the network must call in order to establish the dial-up connection.

Note that the above three different possibilities are not mutually exclusive, and they can co-exist in parallel together with user preferences. For instance, a user can decide to receive voice calls on a GSM phone (first option) and multimedia calls on his computer using the automatic multimedia call on demand (third option). The preferences may be based on time, date, required media streams, called party user, etc.

When a regular IPMM user (A user) places a call whose destination is another Multimedia user (B user), and user B is registered through the RA 101, the (call set-up) signalling reaches a SIP server 105, which forwards the signalling to the RA 101. The RA 101 keeps a registration state based on B's terminal capabilities and his user preferences. Therefore, the RA 101 can make a decision on how to continue with the establishment of the session. The following are example scenarios.

The B User is Using a Non-IPMM Terminal

The B user wants to receive all calls as normal voice calls as he has registered from a non-IPMM terminal (e.g., 2G phone, black phone, ISDN phone, etc.). Once the RA receives the SIP INVITE from the SIP server:

The RA detects that this is an invitation to a user who is registered from a non-IPMM terminal;

The RA provides the telephone number to terminate the call;

The RA forwards the invitation (with the telephone number) to the GSTN gateway;

The GSTN gateway establishes the call to the supplied telephone number.

Figure 6:
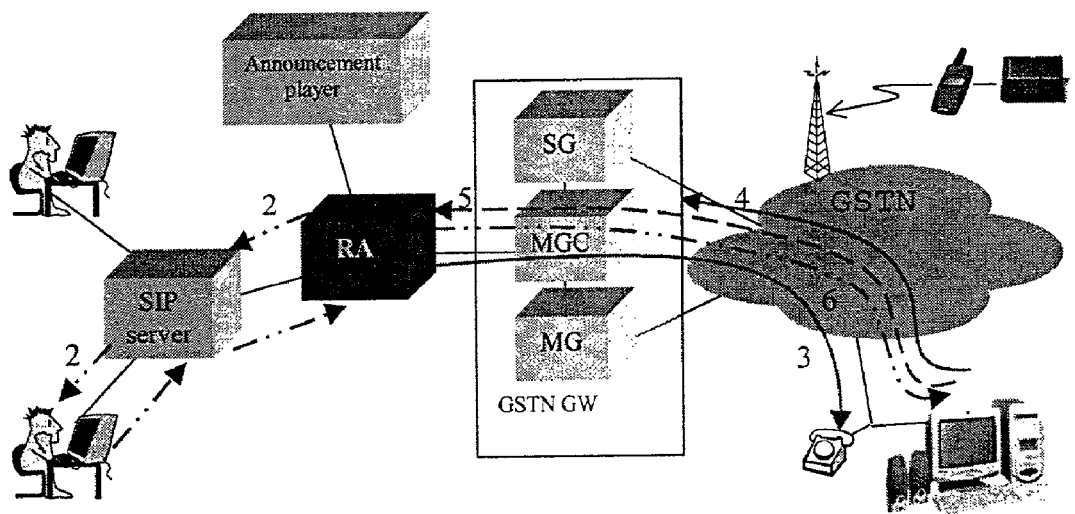
FIG. 6 illustrates schematically a manual procedure for setting up an IP multimedia call.

The User is Registered to Receive Manual Multimedia Calls on Demand (FIG. 6)

In this case, the A user wants to establish a multimedia session with the B user. The B user is registered to the RA from an IPMM terminal so that he can manually establish a dial-up connection in order to receive multimedia sessions. Once the RA receives the SIP INVITE from the SIP server:
1. The RA detects that a manual dial-up connection is needed;
2. The RA does not forward the invitation at this time, but instead it sends a response to the A user to inform him that the request is queued. This is periodically repeated if necessary;

3. Depending on the user preferences, the RA needs to alert the user to the incoming multimedia call. This alert can be sent by an SMS message, pager, telephone call, etc. In the case of a telephone call, the RA connects an announcement player to play the appropriate announcements;
4. Once the user is alerted, he manually establishes a dial-up connection from his IPMM terminal (e.g., computer). This connection runs from the terminal (e.g., computer) to the dial-up server (which is combined with the GSTN gateway);
5. When the dial-up connection is established, the user registers to the RA from the new IPMM terminal;
6. The registration in the RA is the trigger to resume the suspended invitation, and the RA forwards that invitation to the IPMM terminal; and
7. The RA also registers the user to the SIP registrar server on behalf of the user, who is now registered from his IPMM terminal.

Figure 7:
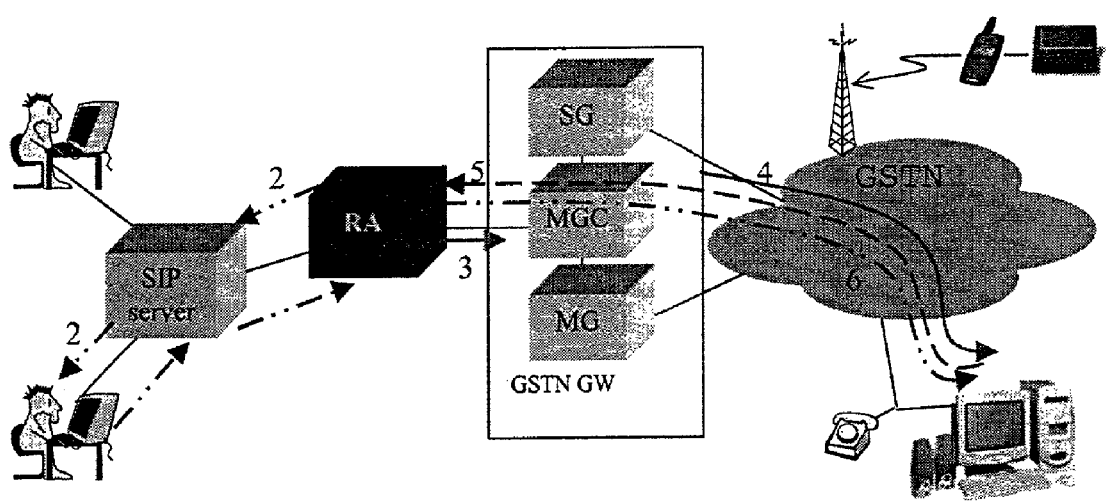
FIG. 7 illustrates an automatic procedure for setting up an IP multimedia call.

The User is Registered to Receive Automatic Multimedia Calls on Demand (FIG. 7)

In this case the A user wants to establish a multimedia session with the B user. The B user is registered to the RA so that he can automatically answer to the establishment of a call-back connection in order to receive multimedia sessions. Once the RA receives the SIP INVITE from the SIP server:
1. The RA detects that an automatic call-back connection is needed;
2. The RA does not forward the invitation at this time, but instead it sends a response to the A user to inform him that the request is queued. This is periodically repeated if necessary;
3. According to the user preferences, the RA instructs the GSTN Gateway to establish a call-back call to a determined telephone number. The user, during the registration procedure, would have supplied the appropriate telephone number;
4. The IPMM terminal (e.g. computer) answers the call-back call and establishes the IP connection. This connection runs from the call-back server (combined with the GSTN gateway) to the terminal (e.g., computer);
5. When the call-back connection is established, the user registers with the RA from the new IPMM terminal;
6. The registration in the RA is the trigger to resume the suspended invitation and the RA forwards that invitation to the IPMM terminal; and
7. The RA also registers the user to the SIP registrar server on behalf of the user, who is registered now from his IPMM terminal.

There are three different procedures to deregister terminals from a previous registration:
1. Timeout of a registration. At the time of registration, there is a negotiation about the time for which the registration is valid. Upon expiry of the registered time, the registration expires without any further action.
2. Explicitly deregistration. This is similar to the registration procedures, but now the user chooses to deregister rather than register.
3. Automatic deregistration by a 2G network. This case is only applicable to the 4. AUTOMATIC REGISTRATION PROCEDURE FOR 2G NETWORKS. When the 2G terminal detaches from the 2G network, the MSC/VLR informs the HSS/HLR. The HSS informs the RA. The RA deregisters the user from the IPMM network.

The invention claimed is:

1. A method of enabling a terminal coupled to a General Switched Telephone Network (GSTN) to join an Internet based presence service facilitated by a presence server, the method comprising:

establishing a telephone connection using an exchange of Short Message Service (SMS) messages between said terminal and an intermediate server via the GSTN;

as a result of said connection, establishing a proxy entity corresponding to said terminal at said intermediate server, the proxy entity being capable of acting on behalf of the terminal, and registering the proxy entity with the presence server via the Internet; and exchanging presence service messages between the presence server and the proxy entity at the intermediate server via the Internet and between the proxy entity and said terminal via the GSTN network.

2. A method according to claim 1, wherein the presence service messages relate to the availability of subscribers of the presence service.

3. A method according to claim 1, wherein the presence service messages are used to convey instant messages such as text messages.

4. A server arranged to enable a terminal coupled to a General Switched Telephone Network (GSTN) network to join an Internet based presence service facilitated by a presence server, the server comprising:

means for establishing using an exchange of SMS messages a telephone connection with said terminal via the GSTN network;

first processing means for establishing a proxy entity corresponding to said terminal, the proxy entity being capable of acting on behalf of the terminal, and registering the proxy entity with the presence server via the Internet; and second processing means for exchanging presence service messages with the presence server via the Internet, and with said terminal via the GSTN network.

5. A method of enabling a terminal coupled to a General Switched Telephone Network (GSTN) to access multimedia services available over an IP network, the method comprising:

establishing, using an exchange of SMS messages, a telephone connection between said terminal and an intermediate server;

as a result of said connection, establishing a proxy entity corresponding to said terminal at the intermediate server, the proxy entity being capable of acting on behalf of the terminal, and registering the proxy entity with a multimedia server via the IP network;

exchanging multimedia call control messages between the multimedia server and the proxy entity at the intermediate server, wherein the intermediate server interprets received call control messages to set up multimedia calls to the GSTN terminal.

6. A method according to claim 5, where the multimedia server is a SIP server, with SIP call control messages being exchanged between the multimedia server and the proxy entity at the intermediate server.

7. A server arranged to enable a terminal coupled to a General Switched Telephone Network (GSTN) to access multimedia services available over an IP network, the server comprising:

means for establishing, using an exchange of SMS messages, a telephone connection with said terminal;

first processing means for establishing a proxy entity corresponding to said terminal, the proxy entity being capable of acting on behalf of the terminal, and for registering the proxy entity with a multimedia server via the IP network;

second processing means for exchanging multimedia call control messages between the multimedia server and the proxy entity, and for interpreting received call control messages to set up multimedia calls to the GSTN terminal.

8. A user terminal arranged to implement the method of claim 1.

9. A user terminal arranged to implement the method of claim 5.

* * * * *

UNITED STATES PATENT AND TRADEMARK OFFICE
CERTIFICATE OF CORRECTION

PATENT NO. : 7,792,906 B2
APPLICATION NO. : 10/216322
DATED : September 7, 2010
INVENTOR(S) : Garcia-Martin et al.

It is certified that error appears in the above-identified patent and that said Letters Patent is hereby corrected as shown below:

In Column 1, Line 45, delete "SUMMARY" and insert -- BRIEF SUMMARY --, therefor.

In Column 10, Line 24, in Claim 3, delete "text messages." and insert -- text messages and multimedia messages. --, therefor.

Signed and Sealed this
First Day of November, 2011

David J. Kappos
*Director of the United States Patent and Trademark Office*